(12) United States Patent
Tanaka et al.

(10) Patent No.: US 9,341,144 B2
(45) Date of Patent: May 17, 2016

(54) CONTROL APPARATUS FOR INTERNAL COMBUSTION ENGINE AND METHOD THEREFOR

(75) Inventors: Satoru Tanaka, Susono (JP); Kota Sata, Susono (JP); Masaaki Ishibuchi, Kobe (JP); Tomohiko Jimbo, Nagakute (JP); Ryoichi Hibino, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 304 days.

(21) Appl. No.: 14/235,815

(22) PCT Filed: Aug. 3, 2012

(86) PCT No.: PCT/IB2012/001657
§ 371 (c)(1),
(2), (4) Date: Jan. 29, 2014

(87) PCT Pub. No.: WO2013/017945
PCT Pub. Date: Feb. 7, 2013

(65) Prior Publication Data
US 2014/0174412 A1   Jun. 26, 2014

(30) Foreign Application Priority Data
Aug. 3, 2011  (JP) .................................. 2011-170089

(51) Int. Cl.
*F02D 41/00* (2006.01)
*F02M 25/07* (2006.01)
*F02D 41/14* (2006.01)

(52) U.S. Cl.
CPC .............. *F02M 25/07* (2013.01); *F02D 41/005* (2013.01); *F02D 41/0065* (2013.01); *F02D 41/0072* (2013.01); *F02D 41/145* (2013.01);

(Continued)

(58) Field of Classification Search
CPC .................................................... F02D 41/0072
USPC ........................................ 123/568.11, 568.21
See application file for complete search history.

(56) References Cited

U.S. PATENT DOCUMENTS 7,016,779 B2 * 3/2006 Bowyer .............. F02D 41/0007
                                                          701/108
2006/0137346 A1    6/2006 Stewart et al.
(Continued)

FOREIGN PATENT DOCUMENTS

EP     2 211 044 A1   7/2010
GB     2 363 210 A   12/2001
(Continued)

*Primary Examiner* — Erick Solis
(74) *Attorney, Agent, or Firm* — Sughrue Mion, PLLC

(57) ABSTRACT

An apparatus controls an internal combustion engine provided with an EGR device having an EGR passage and an EGR valve that is provided in the EGR passage and can adjust an EGR amount. This apparatus includes a controller that estimates state parameters of the internal combustion engine that affect the behavior of the EGR gas within a predetermined period of time; sets constraints on the EGR amount within the predetermined period on the basis of an approximated dynamics obtained by approximating a true dynamics, which is a transition of the EGR amount within the predetermined period, so that approximated values do not exceed the true dynamics; determines a target value of the EGR amount according to the estimated state parameters within a range of the EGR amount on which the constraints that have been set; and controls the EGR valve so that the EGR amount becomes the determined target value.

9 Claims, 6 Drawing Sheets

(52) U.S. Cl.
CPC . *F02D2041/1412* (2013.01); *F02D 2041/1433* (2013.01); *F02D 2200/0408* (2013.01); *Y02T 10/47* (2013.01)

(56) References Cited

U.S. PATENT DOCUMENTS

| | | | |
|---|---|---|---|
| 2007/0068159 A1 | 3/2007 | Ueno et al. | |
| 2010/0101226 A1* | 4/2010 | Shutty | F02D 41/0072 60/602 |
| 2012/0303249 A1* | 11/2012 | Minami | F02D 41/0072 701/112 |

FOREIGN PATENT DOCUMENTS

| | | |
|---|---|---|
| JP | 2000-104595 A | 4/2000 |
| JP | 2004-197618 A | 7/2004 |
| JP | 2004-251288 A | 9/2004 |
| JP | 2007-032462 A | 2/2007 |
| JP | 2007-113563 A | 5/2007 |
| JP | 2010-1795 A | 1/2010 |

* cited by examiner

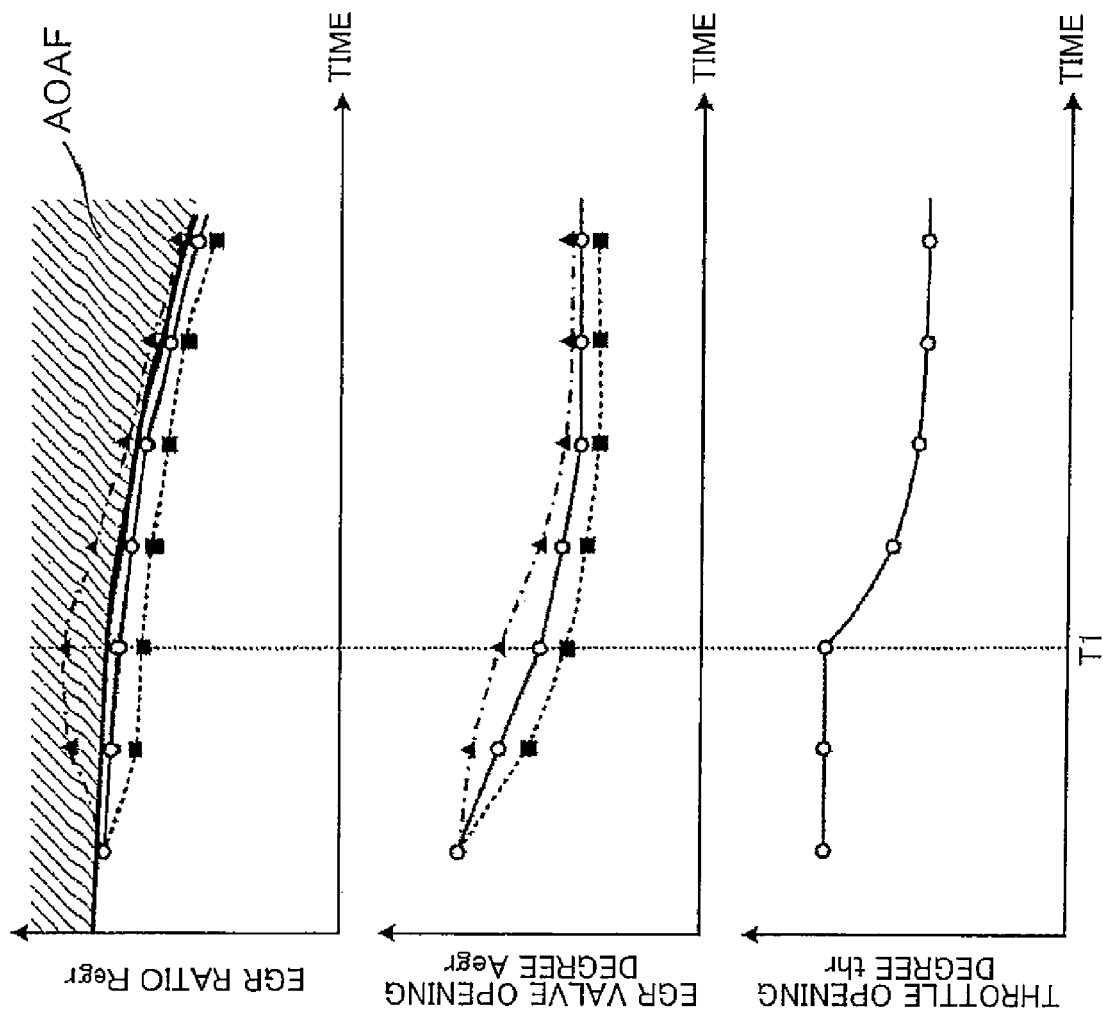

CONTROL APPARATUS FOR INTERNAL COMBUSTION ENGINE AND METHOD THEREFOR

BACKGROUND OF THE INVENTION

1. Field of the Invention

The invention relates to a technical field of control apparatuses for internal combustion engines that control internal combustion engines equipped with an exhaust gas recirculation (EGR) device.

2. Description of Related Art

A control apparatus of such type in which the EGR amount is controlled by a model estimation control method has been suggested (see, for example, Japanese Patent Application Publication No 2007-113563 (JP 2007-113563 A)).

With the control apparatus for an internal combustion engine disclosed in JP 2007-113563 A, the opening degree of an EGR valve is controlled by using a model estimation control method so that the estimated recirculated gas partial pressure Pirest matches a target value Pirref in order to adequately control the EGR valve opening degree.

In various model estimation control methods including the abovementioned model estimation control method, true dynamics that establishes actual constraints on the EGR amount is most often used after approximation in order to reduce the computational load. In particular, when the true dynamics includes a nonlinear portion, the computational load can be greatly reduced by approximating the nonlinear portion by lines.

Accordingly, in order to obtain a more accurate approximation (that is, the approximation having a high geometric identity) of the true dynamics, the relationship between the dynamics after the approximation (referred to hereinbelow as "approximated dynamics" as appropriate) and true dynamics has been discussed.

However, when only the accuracy of approximation is pursued in a simple manner, the relationship between the approximated values forming the approximated dynamics and the corresponding values in the true dynamics is not necessarily unique. Thus, the approximated values of the approximated dynamics sometimes can easily exceed the true dynamics. When the approximated value exceeds the true dynamics, it means that a virtual constraint aimed at the reduction of computational load is more relaxed than the actual constraint.

Accordingly, in particular when the virtual constraint is more relaxed than the actual constraint, an unrealizable EGR amount is actually allowed as a control target, and therefore the combustion performance of the internal combustion engine can be degraded. Thus, when the EGR amount exceeds a misfire limit as a true constraint, the internal combustion engine can misfire. In other words, According to associated with the apparatus including the device disclosed in JP 2007-113563 A, the optimum EGR amount is difficult to maintain under certain driving conditions of a vehicle.

SUMMARY OF THE INVENTION

The invention provides a control apparatus and a control method for an internal combustion engine that enable optimum EGR amount control regardless of the driving conditions of the vehicle.

One mode of the invention resides in a control apparatus for an internal combustion engine that controls an internal combustion engine provided with an EGR device having an EGR passage that recirculates part of an exhaust gas as an EGR gas and an EGR valve that is provided in the EGR passage and that can adjust an EGR amount, which is a flow rate of the EGR gas, the control apparatus including: a controller that performs the following control of: estimating state parameters of the internal combustion engine that affect a behavior of the EGR gas within a predetermined period of time; setting constraints on the EGR amount within the predetermined period of time on the basis of an approximated dynamics obtained by approximating a true dynamics, which is a transition of the EGR amount within the predetermined period of time, so that approximated values do not exceed the true dynamics; determining a target value of the EGR amount according to the estimated state parameters within a range of the EGR amount on which the constraints that have been set; and controlling the EGR valve so that the EGR amount becomes the determined target value.

The control apparatus for an internal combustion engine according to the one mode of the invention can be applied to an internal combustion engine in a general sense of the term that is inclusive of engines that are provided at least with an EGR device and can convert thermal energy generated by combustion of fuel into energy of movement, regardless of practical modes, for example, the number of cylinders, arrangement of cylinders, configuration of intake and exhaust systems, presence or absence of a supercharger, type of fuel, configuration of fuel injection system, and configuration of dynamic valve system. The control apparatus for an internal combustion engine in accordance with the invention, in the embodiment thereof, can use, for example, a single electronic controlled unit (ECU) or computer system, or a plurality thereof, provided with one or a plurality of central processing unit (CPU), micro processing unit (MPU), processors, or controllers. Further, storage devices of various types such as appropriate read only memory (ROM), random access memory (RAM), buffer memories, or flash memories can be used together therewith. The control apparatus for an internal combustion engine of one mode of the invention may be configured as part of a computer device that controls various components (drive valve system, ignition system, or cooling system) of the internal combustion engine.

In the control apparatus for an internal combustion engine according to the one mode of the invention, the controller may set the approximated dynamics to an upper limit value of the EGR amount and determine a target value of the EGR amount below the upper limit value that has been set.

In the control apparatus for an internal combustion engine according to the one mode of the invention, the predetermined period may be a predetermined period from the present into the future.

In the control apparatus for an internal combustion engine according to the one mode of the invention, the controller estimates the state parameters of the internal combustion engine within a predetermined period from the present into the future. At the same time, the constraints on the EGR amount within the predetermined period are set. The predetermined period in which the constraints are set and the predetermined period in with the state parameter's are estimated do not necessarily match each other and, for example, one of the predetermined periods may include the other predetermined period.

The state parameters of the internal combustion engine that are estimated by the controller are state parameters that affect the behavior of the EGR gas (conceptually inclusive of "state parameters that have been set as those affecting the behavior of the EGR gas"), examples thereof including an intake air amount, a new gas flow rate (the amount of new gas sucked into the cylinder), an intake amount (new gas flow rate+EGR amount), an intake pressure (substantially equal to the pressure downstream of the EGR valve), an exhaust gas pressure (substantially equal to the pressure upstream of the EGR valve), an exhaust gas temperature, an EGR valve opening degree (or, cross-section area of the communication passage between the upstream and downstream zones with respect to the EGR valve), an EGR ratio, and an EGR amount (that only some of those parameters may be estimated).

The "constraint on the EGR amount" that is set by the controller means a control limitation of the EGR amount. This constraint (control limitation) may match actual constraints (that is, physical and mechanical limitations or actual limitations) on the internal combustion engine (including the EGR device) when the merits provided by the EGR gas (for example, reduction in the NOx amount resulting from the decreased temperature of exhaust gas) are to be enjoyed as much as possible.

The dynamics of such actual constraints (conceptually can be defined as the quantified behavior of the EGR amount with respect to a certain parameter (for example, the ratio of pressure upstream and downstream of the EGR valve) that does not depend on the parameters (for example, the EGR valve opening degree)) is not necessarily a linear dynamics and is generally a nonlinear dynamics with respect to the greater part of the parameter. When an actual constraint, which is such a nonlinear dynamics, is used for calculating the control amount of the EGR amount or EGR valve opening degree, this actual constraint becomes a factor increasing the computational load. With this in view, in the control apparatus for an internal combustion engine according to the one mode of the invention, the controller is configured to set the constraints on the EGR amount on the basis of an approximated dynamics obtained by approximating the true dynamics that defines the actual constraints.

In this case, the approximated dynamics may be provided in advance or may be acquired, as appropriate, on the basis of the true dynamics obtained experimentally in advance. Further, the practical modes of the approximation can be freely selected, provided that the computational load can be reduced to a some extent, and the concept of the approximation also includes, for example, the case in which when the true dynamics is a linear dynamics including X (X>3) segments, the true dynamics is linearly approximated by Y (Y<X) segments. However, it is preferred that the approximation means a mode in which the true dynamics as a nonlinear dynamics is linearly approximated by a large number of segments.

Approximation accuracy is one of the important factors in the process of generating the approximated dynamics by approximating the true dynamics. When the emphasis is only on the approximation accuracy and no constraints on the approximated values are present, the approximated values can be larger or smaller than the corresponding values in true dynamics. However, when the approximated dynamics exceeds, even partially, the true dynamics, the constraint represented by the approximated values exceeding the true dynamics is a constraint that exceeds actual constraints, that is, an unrealizable constraint. The meaning of "unrealizable constraint" is somewhat ambiguous and can include various modes, for example, a mode in which the opening degree exceeding the physical limitation of the EGR valve is allowed, a mode in which the operation speed exceeding the physical limitation of the EGR valve is allowed, and a mode in which the EGR amount exceeding the misfiring limit of the internal combustion engine is allowed.

With consideration for this issue, the approximated dynamics in accordance with the invention is defined as the dynamics obtained by approximating the true dynamics so that the approximated values do not exceed the true dynamics. Thus, the constraint on the EGR flow rate that is set by the controller on the basis of the approximated dynamics is shifted to the safe side with respect to the true dynamics. Therefore, as long as the controller determines the target flow rate of the EGR gas within the range of constraints set in such a manner, the target flow rate will not violate the actual constraint on the EGR amount.

As a result, when the controller controls the EGR valve so as to obtain the target flow rate that has thus been determined, the possibility of combustion degrading and, in the extreme case, misfiring occurring in the internal combustion engine is eliminated, and the EGR amount can be controlled to the optimum value at all times, regardless of the driving conditions of the vehicle where the internal combustion engine is installed.

In the control apparatus for an internal combustion engine according to the one mode of the invention, the controller may estimate a new gas flow rate, an intake pressure, an exhaust gas pressure, and an exhaust gas temperature in the internal combustion engine as the state parameters.

Since the new gas flow rate, intake pressure, exhaust gas pressure, and exhaust gas temperature are the factors that have strong correlation with the EGR amount, they are appropriate as state parameters relating to the aforementioned mode of the invention. Practical modes taken into account when the controller estimates the state parameter are not particularly limited. However, for example, present values may be acquired from detection means such as sensors corresponding to each estimation object, or estimation computational processing may be performed on the basis of computing equations or physical equations that have been given experimentally, empirically, or theoretically in advance. Alternatively, the future state parameters and present state parameters may be experimentally, empirically, or theoretically associated in advance and stored as a control map or the like in appropriate storage means.

In the control apparatus for an internal combustion engine in accordance with another mode of the invention, the approximated dynamics may be a linear dynamics obtained by linear approximation of the true dynamics, which is a nonlinear dynamics.

The true dynamics is a nonlinear dynamics, and when the approximated dynamics is obtained by linear approximation thereof, the computational load of the approximation is reduced.

In the control apparatus for an internal combustion engine in accordance with another mode of the invention, the true dynamics may be a dynamics determining a behavior of the EGR gas with respect to a ratio of pressures upstream and downstream of the EGR valve in the EGR passage.

The difference in pressure between the zones upstream and downstream of the EGR valve (the "upstream" and "downstream", as referred to herein, are directions that are determined with reference to the flow of the object gas; when those concepts are applied to the EGR valve, the exhaust side is upstream thereof and the intake side is downstream thereof) is a very reasonable factor determining the EGR amount. Therefore, the true dynamics becomes meaningful. The approximated dynamics necessarily also becomes meaningful.

In the control apparatus for an internal combustion engine in accordance with another mode of the invention, the controller may acquire the approximated dynamics by approximating, on the basis of a predetermined criterion, the true dynamics that has been given in advance, and set the constraints on the basis of the acquired approximated dynamics.

With such a mode, the true dynamics that has been experimentally, empirically, or theoretically obtained in advance is subjected to approximation, as appropriate for each case, and acquired as the approximated dynamics. Therefore, for example, a step of increasing or reducing the number of approximation segments, as appropriate for each case, in order to change the approximation accuracy according to conditions can be also taken.

In the control apparatus for an internal combustion engine in accordance with another mode of the invention, the controller may set a constraint arising from a physical limitation on an opening degree of the EGR valve, a constraint arising from a physical limitation on an opening degree variation rate of the EGR valve, and a constraint arising from a misfire limitation on the internal combustion engine as the constraints on the EGR amount.

In this mode, the controller sets a constraint arising from a physical limitation on the opening degree of the EGR valve, a constraint arising from a physical limitation on the opening degree variation rate (substantially equivalent in meaning to the opening-closing speed) of the EGR valve, and a constraint arising from a misfire limitation on the internal combustion engine as the constraints on the EGR amount. Those are the constraints that are referred to when the controller determines the target flow rate of the EGR gas and the parameters that are used when the optimum target flow rate of the EGR gas is determined.

In the control apparatus for an internal combustion engine in accordance with another mode of the invention, the predetermined period may include a time required for the EGR gas to travel from the EGR valve to a cylinder of the internal combustion engine.

The concept of the predetermined period in the mode of the invention is a qualitative concept that does not necessarily require a numerical limitation, and a time zone from the point of time at which the EGR gas passes through the EGR valve to the point of time at which the EGR gas is taken into the cylinder is an example of the predetermined period that is used to control the EGR amount to the optimum value.

Another mode of the invention resides in a control method for an internal combustion engine that controls an internal combustion engine provided with an EGR device having an EGR passage that recirculates part of an exhaust gas as an EGR gas and an EGR valve that is provided in the EGR passage and that can adjust an EGR amount, which is a flow rate of the EGR gas, the control method including: estimating state parameters of the internal combustion engine that affect a behavior of the EGR gas within a predetermined period of time; setting constraints on the EGR amount within the predetermined period of time on the basis of an approximated dynamics obtained by approximating a true dynamics, which is a transition of the EGR amount within the predetermined period of time, so that approximated values do not exceed the true dynamics; determining a target value of the EGR amount according to the estimated state parameters within a range of the EGR amount on which the constraints that have been set; and controlling the EGR valve so that the EGR amount becomes the determined target value.

The above-described effects and other merits of the invention will become apparent from the below-described embodiments.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 9A illustrates by way of example a time characteristic of EGR ratio Regr during gradual deceleration;

FIG. 9B illustrates by way of example a time characteristic of EGR valve opening degree Aegr during gradual deceleration; and FIG. 9C illustrates by way of example a time characteristic of throttle opening degree thr during gradual deceleration.

DETAILED DESCRIPTION OF EMBODIMENTS

An embodiment of the invention will be described hereinbelow with reference to the appended drawings.

Figure 1:
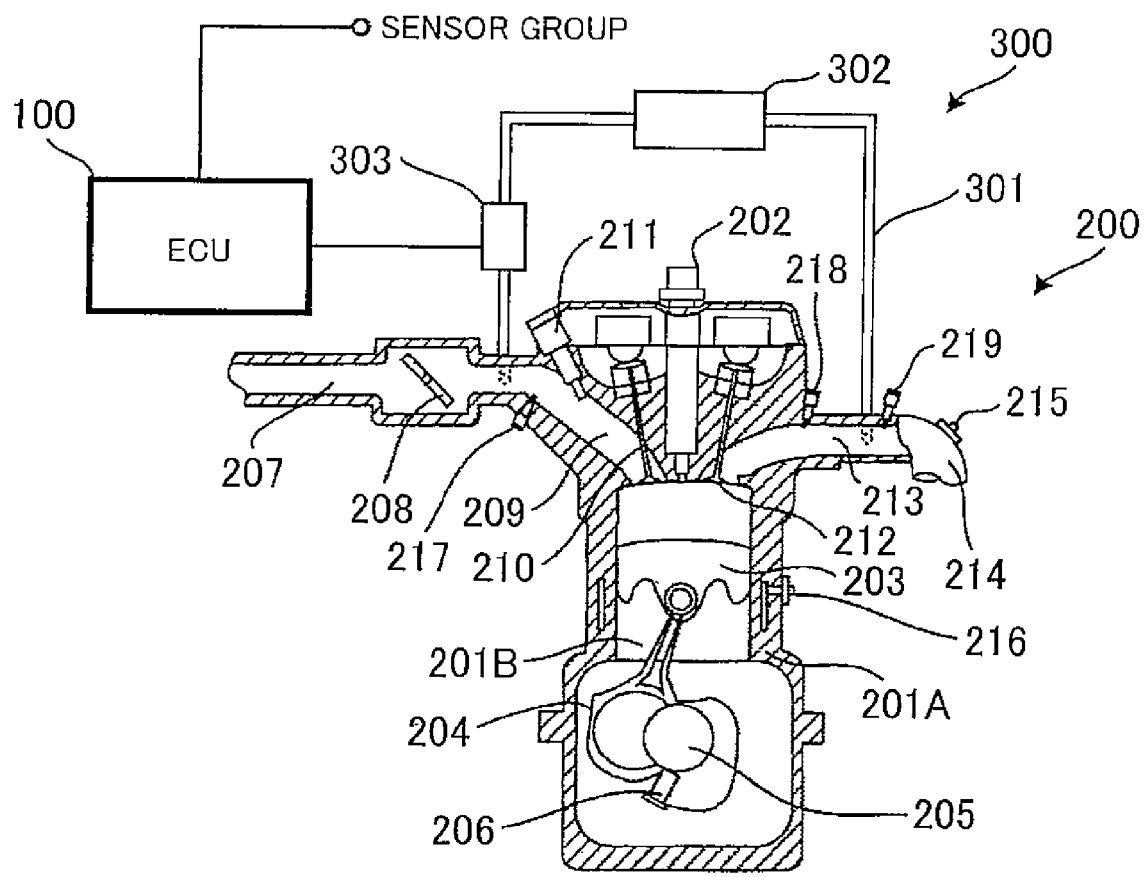
FIG. 1 is a schematic configuration diagram representing conceptually the configuration of the engine system according to a mode of the invention.

The configuration of an engine system 10 relating to an embodiment of the invention will be explained with reference to FIG. 1. FIG. 1 is a schematic configuration diagram representing conceptually the configuration of the engine system 10.

Referring to FIG. 1, the engine system 10 is installed on a vehicle (not shown in the figure) and includes an ECU 100 and an engine 200.

The ECU 100 is provided with a CPU, a ROM, and a RAM and is an electronic control unit configured to be capable of controlling the operation of the engine system 10. This electronic control unit is an example of the "control apparatus for an internal combustion engine" in accordance with the invention. The ECU 100 is configured to be capable of executing the below-described EGR control processing according to a control program stored in the ROM.

Further, the ECU 100 is an electronic control unit that can function as an example of the "controller" in accordance with the invention. However, physical, mechanical, and electric features of the controller in accordance with the invention are not limited thereto. The controller may be configured, for example, as a plurality of ECU, various processing units, various controllers, or various computer systems such as microcomputers.

The engine 200 is a gasoline engine as an example of the "internal combustion engine" in accordance with the invention.

The engine 200 is an engine configured such that a gas mixture of gasoline and air that is combusted by an ignition operation performed by an igniter 202 in which part of a sparkplug (reference numeral thereof is omitted) is exposed in a combustion chamber inside a cylinder 201B accommodated in a cylinder block 201A, and the reciprocating movement of a piston 203 generated in response to the explosive force occurring as a result of the combustion can be converted by a connecting rod 204 into the rotational movement of a crankshaft 205. A crank position sensor 206 that detects the rotation position (that is, the crank angle) of the crankshaft 205 is disposed in the vicinity of the crankshaft 205. The crank position sensor 206 is electrically connected to the ECU 100, and the detected crank angle of the engine 200 is periodically or aperiodically outputted to the ECU 100.

The engine 200 is a multi-cylinder engine in which a plurality of cylinders 201B is arranged in the direction perpendicular to the paper sheet in the figure. Since the cylinders 201B have the same configuration, only one cylinder 201B is explained in FIG. 2. This configuration is merely an example of the "internal combustion engine" in accordance with the invention.

The air sucked in from the outside into the engine 200 passes through an intake pipe 207 and mixes with a port injection fuel Fpi that has been injected from an intake port injector 211 in an intake port 209, thereby producing the aforementioned gas mixture. The fuel is stored in a fuel tank and supplied by pumping to the intake port injector 211 by the action of a feed pipe via a delivery pipe (the fuel tank, feed pump, and delivery pipe are not shown in the figure).

The communication state of the cylinder 201B and the intake port 209 is controlled by opening and closing the intake valve 210. The gas mixture that has burned in the cylinder 201B becomes exhaust gas and is introduced into an exhaust pipe 214 through an exhaust port 213 when and exhaust valve 212 is open. The exhaust valve is open and closed correspondingly to the opening and closing of the intake valve 210.

Meanwhile, a throttle valve 208 that regulates the intake air amount relating to the intake air introduced via a cleaner (not shown in the figure) is provided upstream of the intake port 209 in the intake pipe 207. The throttle valve 208 is configured such that the operation state thereof is controlled by a throttle valve motor (not shown in the figure) that is electrically connected to the ECU 100. The ECU 100 basically controls the operation of the throttle valve motor so as to obtain the throttle opening degree corresponding to the accelerator depression amount Ta detected by an accelerator position sensor (not shown in the figure). The throttle opening degree can be also adjusted by the operational control of the throttle valve motor, regardless of the driver's intension. Thus, the throttle valve 208 is configured as an electronically controlled throttle valve.

An air-fuel ratio sensor 215 configured to be capable of detecting an exhaust gas air-fuel ratio AF of the engine 200 is disposed in the exhaust pipe 214. A cooling water temperature sensor 216 for detecting the cooling water temperature Tw relating to cooling water (LLC) that is supplied by circulation to cool the engine 200 is provided in a water jacket that stretches so as to surround the cylinder block 201A that accommodates the cylinder 201B. An intake pressure sensor 217 for detecting the intake pressure Pi, which is the pressure of the intake air that has passed through the throttle valve 208, is provided in the intake port 209. An exhaust gas temperature sensor 218 for detecting the exhaust temperature To, which is the temperature of the exhaust gas, is provided in the exhaust port 213. Further, an exhaust gas pressure sensor 219 for detecting the exhaust gas pressure Po, which is the pressure of the exhaust gas, is provided in the exhaust port 213. The air-fuel ratio sensor 215, the water temperature sensor 216, the intake pressure sensor 217, the exhaust gas temperature sensor 218, and the exhaust gas pressure sensor 219 are electrically connected to the ECU 100, and the air-fuel ratio AF, cooling water temperature Tw, intake pressure Pi, exhaust gas temperature To, and exhaust gas pressure Po detected by the aforementioned sensors are periodically or aperiodically outputted by the ECU 100.

The engine 200 is provided with an EGR device 300 for recirculating part of the exhaust gas as EGR gas to the intake system.

The EGR device 300 is an example of the "EGR device" in accordance with the invention that is provided with an EGR passage 301, an EGR cooler 302, and an EGR valve 303.

The EGR passage 301 is a metallic tubular member that is connected at one end thereof to the exhaust port 213 and at the other end thereof to the intake port 209. The exhaust port 213 and the intake port 209 are configured to communicate, as appropriate, via the EGR passage 301 when the below-described EGR valve 303 is open.

The EGR cooler 302 is a water-cooled cooling device that cools the as-exhausted EGR gas, which has a comparatively high temperature, by heat exchange with the cooling water.

The EGR valve 303 is an electromagnetic opening-closing valve device which is an example of the "EGR valve" in accordance with the invention and can change continuously the passage area of the exhaust port 213 and the intake port 209 connected by the EGR passage 301. The drive device (for example, a solenoid; not shown in the figure) that drives the EGR valve 303 is electrically connected to the ECU 100, and the EGR valve opening degree Aegr, which is the opening degree of the EGR valve 303, can be controlled by the ECU 100. The "opening degree" as referred to herein means the degree to which the valve is open. As for the EGR valve opening degree Aegr, Aegr=0(%) corresponds to a completely closed (or completely open) valve and Aegr=100% corresponds to a completely open (or completely closed) valve. In any case, there is a one-to-one correspondence between the EGR valve opening degree Aegr and the cross-section area Segr of the communication passage between the upstream side (exhaust port 213 side) and downstream side (intake port 209 side) that with respect to the EGR valve 303.

The abovementioned intake pressure Pi is equal to the EGR valve downstream pressure Pdn, which is a pressure downstream (intake port 209 side) of the EGR valve 303, and the abovementioned exhaust pressure Po is equal to the EGR valve upstream pressure Pup, which is a pressure upstream (exhaust port 213 side) of the EGR valve 303. The EGR amount Megr, which is the flow rate of the EGR gas, changes according to a pressure ratio PR, which is a ratio of the EGR valve upstream pressure Pup and the EGR valve downstream pressure Pdn, and the aforementioned cross-section area Segr of the communication passage. How the EGR amount Megr changes in response to the pressure ratio PR and cross-section area Segr of the communication passage will be explained below.

The EGR control processing executed by the ECU 100 will be explained below in greater detail as an operation of the embodiment.

Figure 2:
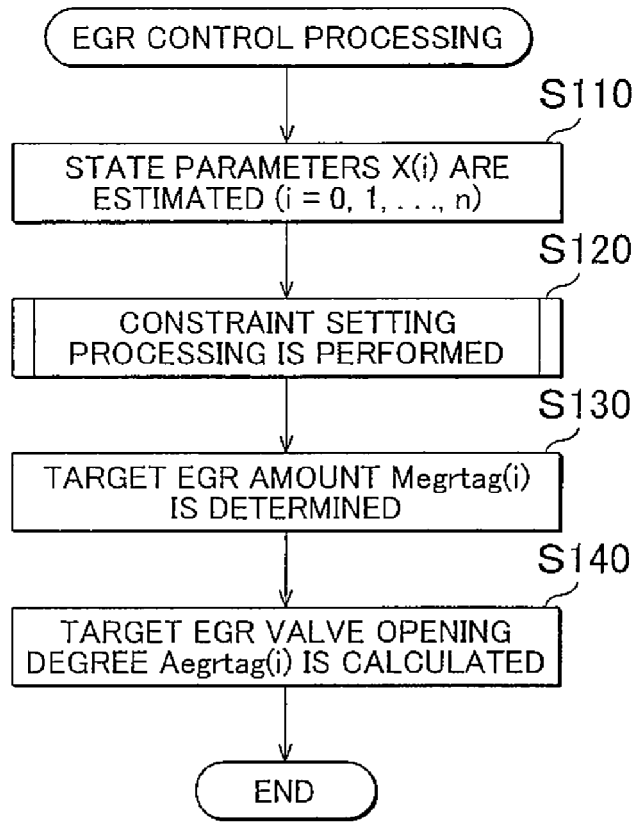
FIG. 2 is a flowchart of the EGR control processing executed by the ECU in the engine system shown in FIG. 1.

The control flow of the EGR control processing will be explained with reference to FIG. 2. FIG. 2 is a flowchart of the EGR control processing.

In FIG. 2, the ECU 100 estimates various state parameters X(i) of the engine 200, which have been set in advance as parameters affecting the behavior of the EGR gas, within a predetermined estimation period (step S110). Step S110 is an example of the operation of the "controller" in accordance with the invention.

The "estimation period" in step S110, as referred to herein, is an example of the "predetermined period" in accordance with the invention and represents a period from a present point of time to a point of time at which the EGR gas is supposed to arrive from the EGR valve 303 to the cylinder 201B, more specifically, a period of about 20 to 100 msec from the present point of time to the future. The ECU 100 divides the estimation period into n equal intervals and estimates in advance the state parameters X(i) at the moments i (i=0, 1, ..., n) corresponding to the boundaries between the intervals. The moment corresponding to i=0 means the present moment.

The ECU 100 is configured to estimate the following state parameters as the state parameters X(i).

The state parameters to be estimated, for example, mean a new gas flow rate Ma(i), a basic target EGR amount Megrtagb (i), an intake pressure Pi(i) (same as the EGR valve downstream pressure Pdn(i)), and an exhaust gas pressure Po(i) (same as the EGR valve upstream pressure Pup(i)). The new gas flow rate Ma(i) relates to the air introduced into the intake port 209 through the intake pipe 207 and the throttle valve 208.

The new gas flow rate Ma(i) is estimated, for example, by the new gas flow rate Ma(0) at the present time that is determined by the intake air amount Ga detected by an air flowmeter disposed in the intake pipe 207, the opening degree thr of the throttle valve 208 at this point of time, and the engine revolution speed NE, by using an estimation computational formula which has been given in advance and defines changes with time of the new gas flow rate Ma within the estimation period.

As has already been mentioned, the throttle valve 208 is operationally controlled by the ECU 100, and therefore changes with time of the throttle opening degree thr can be estimated with high accuracy, provided that the time order is about the estimation period. Changes with time of the engine revolution speed NE also can be estimated in a similar manner. Therefore, the ECU 100 may estimate the new gas flow rate Ma(i), as appropriate, by using the results of those estimations. Alternatively, when the new gas flow rate Ma(i) within the estimation period is mapped in advance by using the new flow rate Ma(0) at the present point of time and various operating conditions of the engine as parameters and stored in appropriate storage means, the ECU 100 may also estimate the new gas flow rate Ma(i) by selecting the appropriate values from the corresponding storage means.

The basic target EGR amount Megrtag(i) means an ideal target EGR amount Megr determined by the new gas flow rate Ma and target EGR ratio Regr. The basic target EGR amount Megrtag(i) may be determined, for example, as Megrtag(i) =Ma(i)*Regr(i)/(1−Regr(i)). The target EGR ratio Regrtag(i) is taken to be uniform with respect to one estimation period.

Changes with time of the intake pressure Pi(i) (EGR valve downstream pressure Pdn(i)) and the exhaust gas pressure Po(i) (EGR valve upstream pressure Pup(i)) can be also estimated, similarly to the new gas flow rate Ma(i)), by using an estimation computational formula or map. Since a variety of techniques are available and can be used for estimating such state amounts, the detailed explanation thereof is herein omitted.

Where the estimation of the state parameters X(i) is completed, the ECU 100 executes a constraint setting processing (step S120). Step S120 is an example of the operation of the "controller" in accordance with the invention.

Figure 3:
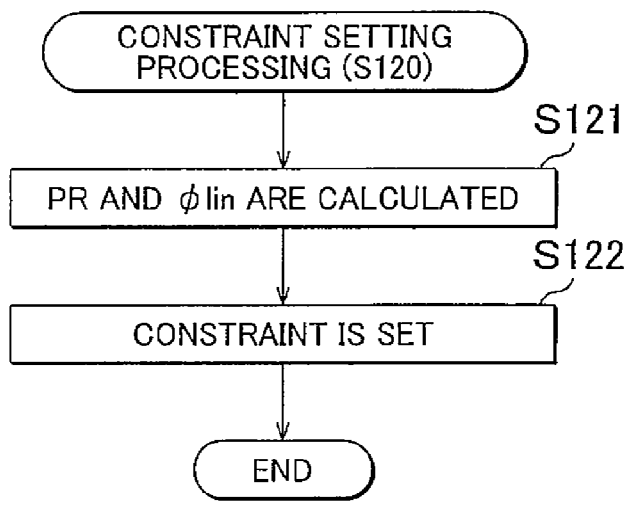
FIG. 3 is a flow chart of the constraint setting processing, which is a sub-routine of the EGR control processing shown in FIG. 2.

The constraint setting processing will be explained below with reference to FIG. 3. FIG. 3 is a flow chart of the constraint setting processing.

As shown in FIG. 3, the ECU 100 calculates the pressure ratio PR(i) and linear approximation dynamics φlin(i) (step S121).

In the embodiment, the pressure ratio PR(i) is represented by Eq. (1) below. As clearly follows from Eq. (1) below, the pressure ratio PR is a ratio of the EGR valve downstream pressure Pdn (intake pressure Pi) to the EGR value upstream pressure Pup (exhaust pressure Po) and this ratio decreases as the EGR value upstream pressure Pup becomes larger than the EGR valve downstream pressure Pdn.

[E1]
$$PR(i) = \frac{Pdn(i)}{Pup(i)} \quad (1)$$

Meanwhile, the linear approximation dynamics φlin(i) is determined by Eq. (2) below.

[E2]
$$\phi lin(i) = \begin{cases} B1 & (0 \le PR(i) < c) \\ a2 * PR(i) + b2 & (c \le PR(i) < 1) \end{cases} \quad (2)$$

Figure 4:
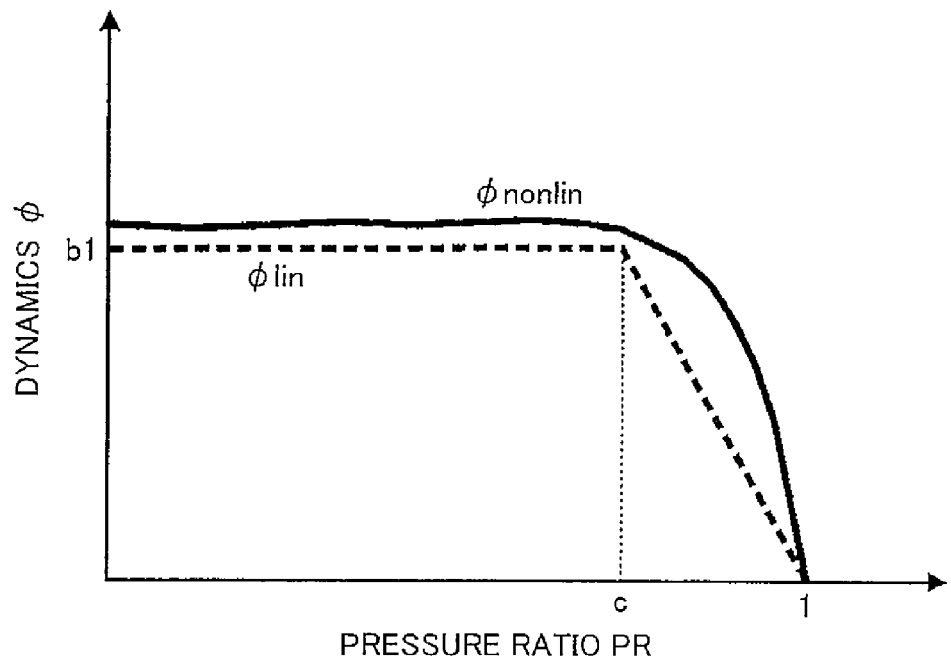
FIG. 4 represents the dynamics of the EGR amount Megr with respect to the pressure ratio PR.

The linear approximation dynamics φlin(i) will be explained hereinbelow in greater detail with reference to FIG. 4. FIG. 4 represents the dynamics of the EGR amount Megr vs. the pressure ratio PR.

In FIG. 4, the dynamics of the EGR amount Megr is plotted against the ordinate, and the pressure ratio PR is plotted against the abscissa. The dynamics of the EGR amount Megr, as referred to herein, is a value obtained by quantifying the qualitative behavior of the EGR amount Megr that does not depend on the EGR valve opening degree Aegr.

In the figure, φnonlin (solid line) is a nonlinear dynamics, as shown in the figure, which is a true dynamics of the EGR amount Meg. The true dynamics φnonlin is obtained experimentally in advance and stored in the ROM. The EGR gas basically does not return to the intake system unless the EGR valve upstream pressure Pup is larger than the EGR valve downstream pressure Pdn. Therefore, the EGR amount Megr becomes equal to zero at a point of time in which the two pressures are equal to each other and the pressure ratio PR=1 is reached. Thus, the maximum value of the pressure ratio PR is essentially 1.

The linearly approximated dynamics φlin (broken line) is obtained by linear approximation of the true dynamics φnonlin in m intervals (m≥2) and is an example of the "approximated dynamics" in accordance with the invention. As shown in the figure, the linearly approximated dynamics φlin assumes a constant value b1 within a region in which the pressure ratio PR is equal to or less than c and becomes a monotonously decreasing function with respect to the pressure ratio PR in a region in which the pressure ratio PR is larger than c. With such linearly approximated dynamics φlin, the true dynamics φnonlin, which is inherently a nonlinear dynamics, can be greatly simplified. Therefore, when the constraint of the EGR amount Megr is set as described hereinbelow, the computational load of the ECU 100 is greatly reduced. In the example shown herein, the two-interval linear approximation is performed, but such approximation is obviously selected only to facilitate the explanation and the linear approximation may be actually performed in a large number of intervals. The process of acquiring the linearly approximated dynamics φlin(i) by linearly approximating the true dynamics φnonlin is an example of the operation of the "controller" in accordance with the invention.

In this case, where the true dynamics φnonlin is linearly approximated, the ECU 100 performs the approximation such that the approximated values do not exceed the true dynamics φnonlin. The linearly approximated dynamics φlin (broken line) is always set to be visually on the inner side (coordinate axis side) of the true dynamics φnonlin (solid line). The effect of such an approach is described below.

Returning to FIG. 3, where the ECU 100 calculates the pressure ratio PR(i) and φlin(i) (φlin(i) means approximated values of the linearly approximated dynamics corresponding to the pressure ratio PR(i)), the ECU 100 sets the constraint on the EGR amount Megr (step S122). The constraint on the EGR amount Megr, as referred to herein, is a control constraint on the EGR amount Megr generated due to various constraints of the engine 200 including the EGR device 300. In the embodiment, three constraints are set, namely, a first constraint arising from the EGR valve opening degree Aegr, a second constraint arising from the opening/closing speed of the EGR valve 303, and a third constraint arising from the misfiring limit of the engine 200.

Concerning the first constraint, the EGR valve opening degree Aegr is merely a convenient indicator obtained by converting the opening degree of the EGR valve 303 into a numerical value, and the actual EGR amount Megr depends on the communication cross-section area Segr of the communication passage that is in a one-to-one correspondence relationship with the EGR valve opening degree Aegr. Therefore, in the explanation below, the EGR valve opening degree Aegr will be replaced, as appropriate, by the communication cross-section area Segrr of the communication passage. Concerning the second constraint, for the same reason as related to the first constraint, the opening-closing speed of the EGR valve 303 will be replaced, as appropriate, with the variation speed of the communication cross-section area Segrr of the communication passage.

As premises for setting the constraint on the EGR amount Megr, the EGR amount Megr(i) can be represented by Eq. (3) below, and the EGR gas flow rate variation rate dMegr(i) can be represented by Eq. (4) below.

[E3]

$$Megr(i) = Segr(i) * \sqrt{\frac{Pup(i)}{Tup(i)}} * \phi lin(i) \quad (3)$$

[E4]

$$dMegr(i) = Megr(i) - Megr(i-1) \quad (4)$$

The first constraint is a constraint on the EGR valve opening degree Aegr (communication cross-section area Segr), that is, a constraint arising from a physical limitation of the opening degree of the EGR valve 303. The constraint condition is represented by Eq. (5) below. Segrmax in the equation is the maximum value of the communication cross-section area Segr, that is, the communication cross-section area Segr at which the EGR valve opening degree Aegr=100.

[E 5]

$$0 \leq Segr(i) \leq Segrmax \quad (5)$$

In this case, the ECU 100 converts the constraint condition relating to the first constraint represented by Eq. (5) above into the constraint on the EGR amount Megr, as in Eqs. (6), (7), and (8) below. Tup in the equations is a temperature upstream of the EGR valve, that is, has the same meaning as the exhaust gas temperature To detected by the exhaust gas temperature sensor 218. Eq. (7) is used when the pressure ratio PR(i) is equal to or less than c, and Eq. (8) is used when the pressure ratio PR(i) is greater than c and equal to or less than 1.

[E6]

$$-Megr(i) \leq 0 \quad (6)$$

[E7]

$$Megr(i) \leq Segrmax * \sqrt{\frac{Pup(i)}{Tup(i)}} * b1 \quad (7)$$

[E8]

$$Megr(i) \leq Segrmax * \sqrt{\frac{Pup(i)}{Tup(i)}} * (a2 * PR(i) + b2) \quad (8)$$

Figure 5:
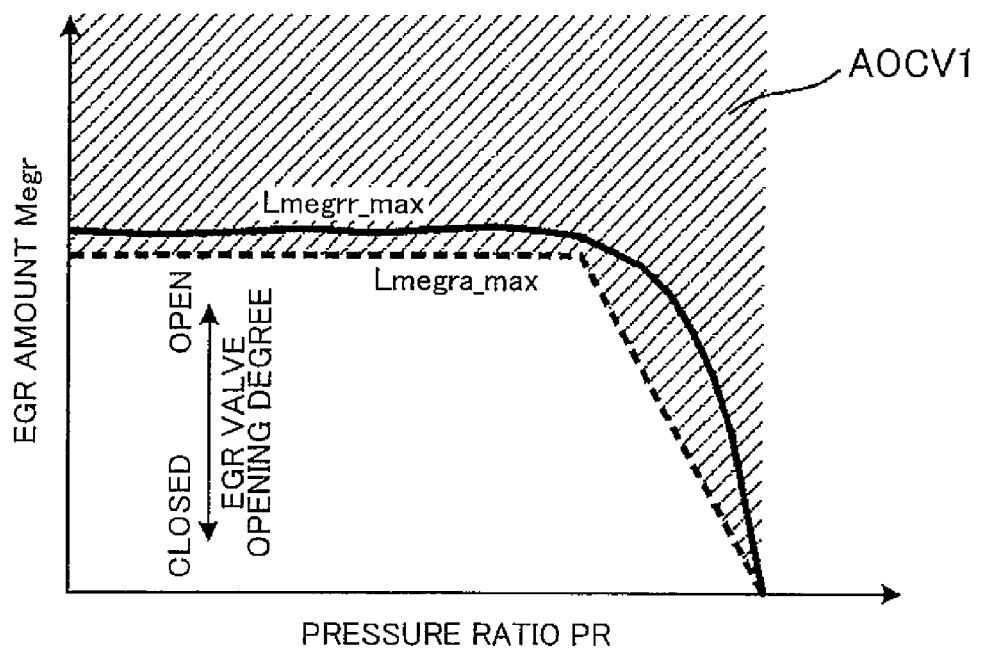
FIG. 5 is a conceptual diagram of the first constraint.

Here, the first constraint will be visually explained with reference to FIG. 5. FIG. 5 is a conceptual diagram of the first constraint.

In FIG. 5, the EGR amount Megr is plotted against the ordinate, and the pressure ratio PR is plotted against the abscissa.

Lmegrr_max (solid line) in the figure is a true dynamics of the EGR amount Megr in the case where the EGR valve opening degree Aegr is at its maximum. The region below the Lmegrr_max is a region that can be realized as the EGR valve opening degree Aegr.

Meanwhile, as has been indicated hereinabove, in the embodiment, the true dynamics of the EGR amount Megr is linearly approximated so that the approximated values do not exceed the true dynamics. Therefore, the control constraint (first constraint) that is set on the basis of the linearly approximated dynamics φlin is determined by the Lmegra_max (solid line) in the figure. Thus, the region above the Lmegra_max in the figure (shown by hatching in the figure) is a constraint violation region AOCV1 in which the control constraint is violated.

The second constraint arises from the opening-closing speed (variation rate of the cross-section area Segr of the communication passage) of the EGR valve 303, that is, from the physical limitation of the opening-closing speed of the EGR valve 303. The constraint condition is represented by Eqs. (9) and (10) below. Sopenmax in the equation below is the maximum value of time variation rate of the cross-section area Segr of the communication passage in the case where the cross-section area Segr of the communication passage increases (that is, when the EGR valve 303 opens), and Sclosemax in the equation below is the maximum value of time variation rate of the cross-section area Segr of the communication passage in the case where the cross-section area Segr of the communication passage decreases (that is, when the EGR valve 303 closes.)

[E 9]

$$dSegr(i) \leq dSopenmax \quad (9)$$

[E 10]

$$-dSegr(i) \geq dSclosemax \quad (10)$$

In this case, the ECU 100 converts the constraint condition relating to the second constraint represented by Eqs. (9) and (10) above into the constraint on the EGR amount variation rate dMegr, as in Eqs. (11), (12), (13) and (14) below. Eqs. (11) and (12) are used when the pressure ratio PR(i) is equal to or less than c, and Eqs. (13) and (14) are used when the pressure ratio PR(i) is greater than c and equal to or less than 1. Further, Eqs. (11) and (13) represent a constraint imposed when the valve is opened, and Eqs. (12) and (14) represent a constraint imposed when the valve is closed.

[E11]
$$dMegr(i) \le dSopen\max * \sqrt{\frac{Pup(i)}{Tup(i)}} * b1 \quad (11)$$

[E12]
$$dMegr(i) \le -dSclose\max * \sqrt{\frac{Pup(i)}{Tup(i)}} * b1 \quad (12)$$

[E13]
$$dMegr(i) \le dSclose\max * \sqrt{\frac{Pup(i)}{Tup(i)}} * (a2 * PR(i) + b2) \quad (13)$$

[E14]
$$dMegr(i) \le -dSclose\max * \sqrt{\frac{Pup(i)}{Tup(i)}} * (a2 * PR(i) + b2) \quad (14)$$

Figure 6:
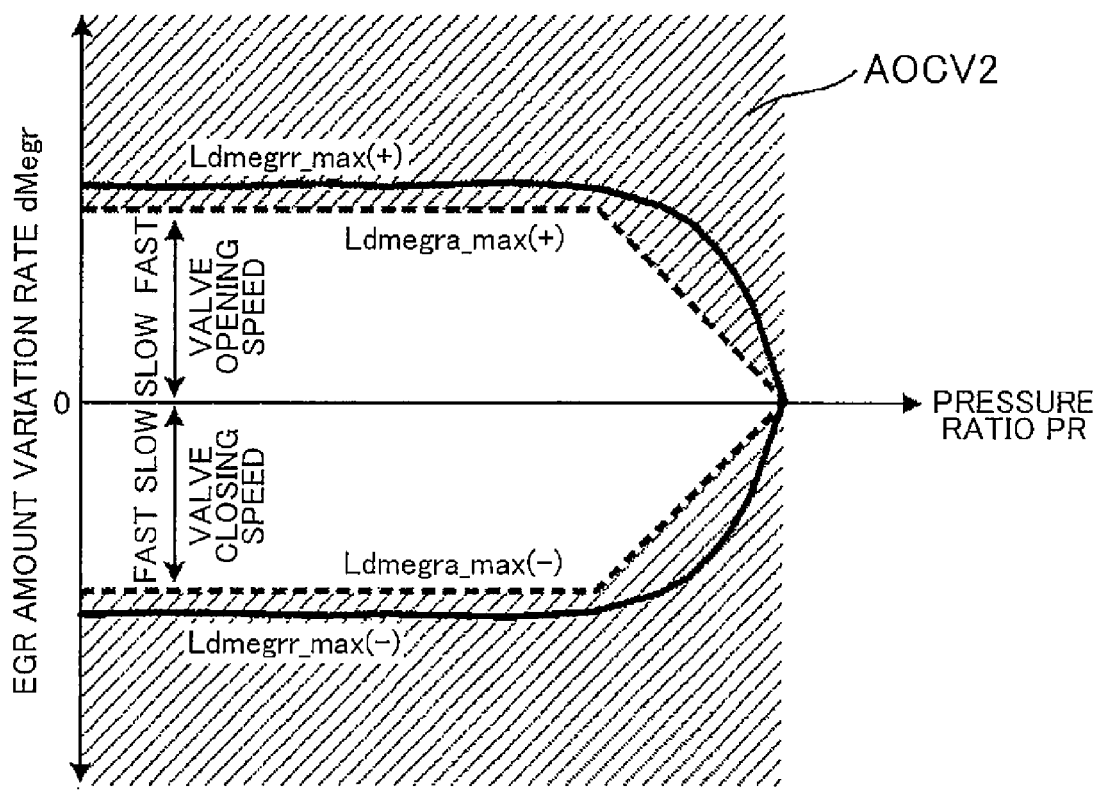
FIG. 6 is a conceptual diagram of the second constraint.

Here, the second constraint will be visually explained with reference to FIG. 6. FIG. 6 is a conceptual diagram of the second constraint.

In FIG. 6, the EGR amount variation rate dMegr is plotted against the ordinate, and the pressure ratio PR is plotted against the abscissa. The region above the point of origin relates to the interval in which the valve is open, and the region below the point of origin relates to the interval in which the valve is closed.

Ldmegrr_max(+) (solid line) in the figure is a true dynamics of the EGR amount variation rate dMegr in the case where the EGR valve 303 is opened at a maximum speed. The region above the origin point line and below the Ldmegrr_max(+), inclusive thereof, is a region that can be realized as the EGR amount variation rate dMegr. Likewise, Ldmegrr_max(−) (solid line) in the figure is a true dynamics of the EGR amount variation rate dMegr in the case where the EGR valve 303 is closed at a maximum speed. The region below the origin point line and above the Ldmegrr_max(−), inclusive thereof, is a region that can be realized as the EGR amount variation rate dMegr.

Meanwhile, as described hereinabove, in the embodiment, the true dynamics of the EGR amount Megr is linearly approximated so that the approximated values do not exceed the true dynamics. Therefore, the control constraint (second constraint) that is set on the basis of the linearly approximated dynamics φlin is determined as Ldmegra_max(+) shown in the figure (broken line) on the open-valve side and as Ldmegra_max(−) (broken line) on the closed-valve side. The region that is above Ldmegra_max(+) shown in the figure and the region that is below Ldmegra_max(−) shown in the figure (regions represented by hatching in the figure) are constraint violation regions AOCV2 in which the control constraints are violated.

The third constraint relates to the misfire limitation on the engine 200, that is, the EGR rate Regr. In this case, the EGR ratio Regr at which misfire occurs changes depending on the structure or operating conditions of the engine 200. Therefore, the EGR ratio Regr serving as a misfire limitation is determined experimentally in advance as a constraint condition relating to the third constraint and stored in the ROM. The ECU 100 converts the constraint condition on the EGR ratio Regr into the constraint on the EGR amount Megr, as shown by Eq. (15) below. In the equation, Mlim means the EGR amount that is the misfire limit.

[E 15]
$$Megr(i) \le Megrlim \quad (15)$$

Where the first, second, and third constraints are thus determined as values correlating with the EGR amount Megr, the constraint setting processing is completed and the processing advances to step S130 of the EGR control processing.

Returning to FIG. 2, in step S130, the target EGR amount Megrtag(i) is determined. The target EGR amount Megrtag(i) is a control target value that is determined on the basis of the basic target EGR amount Megrtagb(i) and the abovementioned constraints. More specifically, the ECU 100 determines the optimum EGR amount at which the abovementioned constraints are satisfied as the target EGR amount Megrtag(i). The process relating to such determination of the target EGR amount is an example of the operation of the "controller" in accordance with the invention. The ECU 100 may also take the value that is the closest to the basic target EGR amount Megrtagb(i) as the target EGR amount within a range in which the abovementioned constraints are satisfied. In the case where the basic target EGR amount Megrtagb(i) dose not violate the constraints, the basic target EGR amount Megrtagb(i) and the target EGR amount Megrtag(i) may coincide.

Where the target EGR amount Megrtag(i) is to be determined, the ECU 100 converts the target EGR amount Megrtag(i) into the EGR valve opening degree Aegr and calculates the target EGR valve opening degree Aegrtag(i) (step S140). In this case, the ECU 100 uses the true dynamics of the EGR amount Megr shown by way of example in FIG. 5. Thus, the true dynamics of the EGR amount Megr corresponding to the pressure ratio PR for each EGR valve opening degree Aegr is stored in the ROM (only the dynamics corresponding to the maximum opening degree is represented in FIG. 5), and the target EGR amount Megrtag(i) can be easily converted into the EGR valve opening degree Aegr.

Where the target EGR valve opening degree Aegrtag(i) is to be determined, the ECU 100 performs successive drive control of the EGR valve 303 in a time sequence so as to obtain the target EGR valve opening degree Aegrtag(i) (that is, an example of the operation of the "controller" in accordance with the invention). The EGR control processing is executed as described hereinabove. In this case, the EGR control processing is not described as a loop processing, but the EGR control processing is basically executed repeatedly at all times within the operation period of the engine 200.

Figure 7:
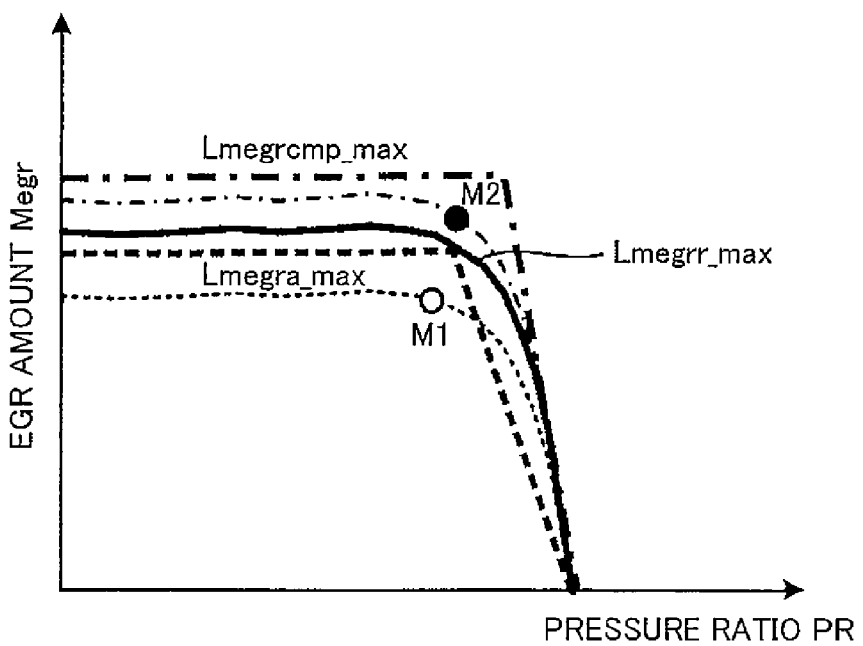
FIG. 7 illustrates the effect of the first constraint.

The effect of the first and second constraints will be explained hereinbelow with reference to FIGS. 7 and 8. FIG. 7 illustrates the effect of the first constraint, and FIG. 8 instates the effect of the second constraint. The locations shown in these figures that are similar to those of the above-described figures are assigned with the same reference numerals and the explanation thereof is herein omitted as appropriate.

In FIG. 7, a comparative constraint Lmegrcmp_max (chain line) that has been set on the basis of the comparative linearly approximated dynamics obtained by linearly approximating the nonlinear dynamics φnonlin shown by way of example in FIG. 4 (in this approximation, the approximated values are allowed to exceed the true dynamics) is shown as a comparative example of the first constraint Lmegra_max (broken line) according to the embodiment.

Here, when the comparative constraint Lmegrcmp_max is taken as the control constraint, the EGR amount indicated by a black circle M2 in the figure also satisfies the control constraints. However, as shown by a fine chain line in the figure, the EGR amount corresponding to the black circle M2 is located in a region exceeding the true dynamics (solid line) of the EGR amount Megr corresponding to the maximum opening degree of the EGR valve 303 and is therefore an intrinsically unrealizable EGR amount. Therefore, where the EGR amount corresponding to the black circle M2 is allowed in the EGR control processing, the EGR amount determined by the ECU 100 will differ from the actual EGR amount and the combustion can be degraded.

By contrast, with the first constraint Lmegra_max according to the embodiment, the target EGR amount Megrtag determined in this case is represented, for example, by a white circle M1 shown in the figure, and the EGR valve opening degree Aegr is always maintained at a value less than the actual constraint (that is, the maximum opening degree of the EGR valve 303).

Figure 8:
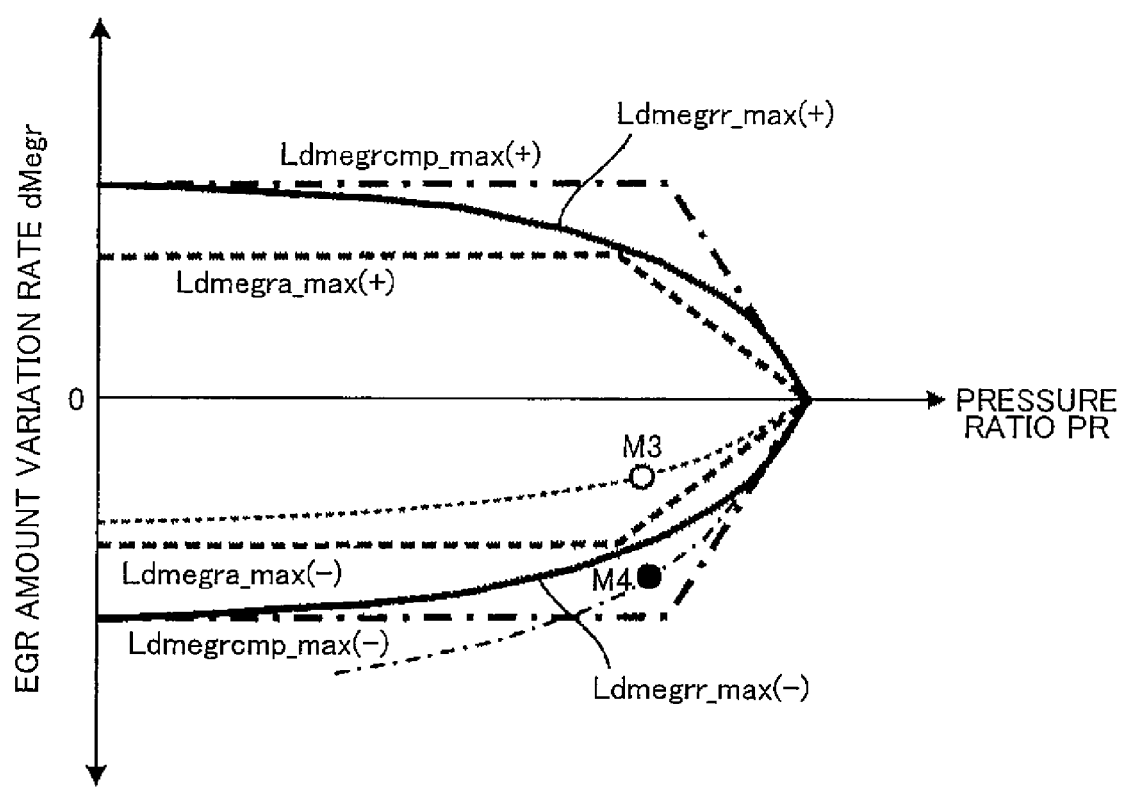
FIG. 8 illustrates the effect of the second constraint.

Meanwhile, in FIG. 8, a comparative constraint Ldmegrcmp_max (chain line) that has been set on the basis of the comparative linearly approximated dynamics obtained by linearly approximating the nonlinear dynamics φnonlin shown by way of example in FIG. 4 (in this approximation, the approximated values are allowed to exceed the true dynamics) is shown as a comparative example of Ldmegra_max (broken line), which is one of the second constraints according to the embodiment (the positive and negative signs have already been described and are not distinguished herein).

Here, when the comparative constraint Ldmegrcmp_max is taken as the control constraint, the EGR amount variation rate dMegr indicated by a black circle M4 in the figure also satisfies the control constraint. However, as shown by a fine chain line in the figure, the EGR amount variation rate dMegr corresponding to the black circle M4 is located in a region exceeding the true dynamics Ldmegrr_max(−) (solid line) of the EGR amount variation rate dMegr corresponding to the maximum valve closing speed of the EGR valve 303 and is therefore an intrinsically unrealizable EGR amount variation rate. Therefore, where the EGR amount variation rate corresponding to the black circle M4 is allowed in the EGR control processing, the ECU 100 will wrongly assume that the EGR valve 303 has been closed faster than it actually was. As a result, depending on how the subsequent control is performed, the EGR amount determined by the ECU 100 can differ from the actual EGR amount and the combustion can be degraded.

By contrast, with the second constraint determined by the linearly approximated dynamics Ldmegra_max(−) according to the embodiment, the EGR amount variation rate dMegr represented by the black circle M4 does not satisfy the constraint and is therefore not allowed, and the actual EGR amount variation rate is always maintained at a value less than the actual constraint (that is, the EGR amount variation rate corresponding to the maximum closing speed of the EGR valve 303), for example, as shown by a white circle M3 in the figure.

The effect of the embodiment will be explained hereinbelow with reference to FIGS. 9A to 9C. FIGS. 9A to 9C illustrate by way of examples the behavior of the EGR gas during gradual deceleration of the vehicle that carries the engine system 10. The locations shown in these figures that are similar to those of the above-described figures are assigned with like reference numerals and the explanation thereof is herein omitted as appropriate.

In FIGS. 9A to 9C, the time characteristics of the EGR ratio Regr, EGR valve opening degree Aegr, and throttle opening degree thr are shown from the top in the order of description.

At a time T1 shown in the figure, the throttle valve 208 starts closing slowly and the vehicle starts decelerating gradually as the accelerator pedal is released. At this time, aside of the computational load, when the EGR valve opening degree Aegr is controlled according to the actual constraint (so to say, the ideal constraint), which is the nonlinear dynamics, the EGR valve opening degree Aegr changes as shown by the solid line in the figure.

In this case, where the above-mentioned comparative constraint is taken as the control constraint, the decrease in the EGR valve opening degree Aegr is slower than that in the case where the actual constraint is applied, as shown by a chain line in the figure. Therefore, the EGR ratio Regr moves in the misfire region AOAF shown by hatching in the figure and the engine 200 can misfire.

By contrast, when the constraints based on the linearly approximated dynamics according to the embodiment are used, the EGR valve opening degree Aegr constantly moves on the side restrained (safe) with respect to that corresponding to the actual constraints, as shown by a broken line in the figure, and therefore the EGR ratio Regr is provided with a larger safe-side margin, as also shown by a broken line in the figure. Thus, the possibility of the engine 200 misfiring is eliminated. Therefore, according to the embodiment, even when the flow rate control of the EGR gas is generally difficult to perform, as during gradual deceleration of the above-described type, practical merits of the EGR can be fully maintained. Thus, the optimum EGR amount can be realized at all times, regardless of the driving conditions of the vehicle.

The invention is not limited to the above-described embodiments and can be changed, as appropriate, without departing from the gist or idea of the invention defined by the claims and the entire description, and the control apparatus for an internal combustion engine resulting from such changes is also included in the technical scope of the invention.

The invention can be used for controlling an internal combustion engine equipped with an EGR device.

The invention claimed is:

1. A control apparatus for an internal combustion engine that controls an internal combustion engine provided with an EGR device having an EGR passage that recirculates part of an exhaust gas as an EGR gas and an EGR valve that is provided in the EGR passage and that can adjust an EGR amount, which is a flow rate of the EGR gas, the control apparatus comprising:
a controller that performs the following control of:
estimating state parameters of the internal combustion engine that affect a behavior of the EGR gas within a predetermined period of time;
setting constraints on the EGR amount within the predetermined period of time on the basis of an approximated dynamics obtained by approximating a true dynamics, which is a transition of the EGR amount within the predetermined period of time, so that approximated values do not exceed the true dynamics;
determining a target value of the EGR amount according to the estimated state parameters within a range of the EGR amount on which the constraints have been set; and
controlling the EGR valve so that the EGR amount becomes the determined target value,
wherein the controller sets at least one of a constraint arising from a physical limitation on an opening degree of the EGR valve, a constraint arising from a physical limitation on an opening degree variation rate of the EGR valve, and a constraint arising from a misfire limitation on the internal combustion engine as the constraints on the EGR amount.

2. The control apparatus for an internal combustion engine according to claim 1, wherein
the controller sets the approximated dynamics to an upper limit value of the EGR amount and determines a target value of the EGR amount below the upper limit value that has been set.

3. The control apparatus for an internal combustion engine according to claim 1, wherein
the predetermined period is a predetermined period from the present into the future.

4. The control apparatus for an internal combustion engine according to claim 1, wherein
the controller estimates a new gas flow rate, an intake pressure, an exhaust gas pressure, and an exhaust gas temperature in the internal combustion engine as the state parameters.

5. The control apparatus for an internal combustion engine according to claim 1, wherein
the approximated dynamics is a linear dynamics obtained by linear approximation of the true dynamics, which is a nonlinear dynamics.

6. The control apparatus for an internal combustion engine according to claim 1, wherein
the true dynamics is a dynamics determining a behavior of the EGR gas with respect to a ratio of pressures upstream and downstream of the EGR valve in the EGR passage.

7. The control apparatus for an internal combustion engine according to claim 1, wherein
the controller acquires the approximated dynamics by approximating, on the basis of a predetermined criterion, the true dynamics that has been given in advance, and sets the constraints on the basis of the acquired approximated dynamics.

8. The control apparatus for an internal combustion engine according to claim 1, wherein
the predetermined period includes a time required for the EGR gas to travel from the EGR valve to a cylinder of the internal combustion engine.

9. A control method for an internal combustion engine that controls an internal combustion engine provided with an EGR device having an EGR passage that recirculates part of an exhaust gas as an EGR gas and an EGR valve that is provided in the EGR passage and that can adjust an EGR amount, which is a flow rate of the EGR gas,
the control method comprising:
estimating state parameters of the internal combustion engine that affect a behavior of the EGR gas within a predetermined period of time;
setting constraints on the EGR amount within the predetermined period of time on the basis of an approximated dynamics obtained by approximating a true dynamics, which is a transition of the EGR amount within the predetermined period of time, so that approximated values do not exceed the true dynamics;
determining a target value of the EGR amount according to the estimated state parameters within a range of the EGR amount on which the constraints have been set; and
controlling the EGR valve so that the EGR amount becomes the determined target value,
wherein the constraints on the EGR amount is at lease one of a constraint arising from a physical limitation on an opening degree of the EGR valve, a constraint arising from a physical limitation on an opening degree variation rate of the EGR valve, and a constraint arising from a misfire limitation on the internal combustion engine.

* * * * *